(12) United States Patent
Aoki et al.

(10) Patent No.: US 11,906,888 B2
(45) Date of Patent: Feb. 20, 2024

(54) LIGHT SOURCE APPARATUS AND PROJECTOR

(71) Applicant: SEIKO EPSON CORPORATION, Tokyo (JP)

(72) Inventors: Shigekazu Aoki, Matsumoto (JP); Shingo Komiyama, Chino (JP); Junichi Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 408 days.

(21) Appl. No.: 17/212,710

(22) Filed: Mar. 25, 2021

(65) Prior Publication Data

US 2021/0302822 A1 Sep. 30, 2021

(30) Foreign Application Priority Data

Mar. 26, 2020 (JP) ................ 2020-055514

(51) Int. Cl.
G03B 21/20 (2006.01)
H04N 9/31 (2006.01)
G03B 21/16 (2006.01)

(52) U.S. Cl.
CPC ......... *G03B 21/2013* (2013.01); *G03B 21/16* (2013.01); *G03B 21/204* (2013.01); *H04N 9/3161* (2013.01); *H04N 9/3164* (2013.01)

(58) Field of Classification Search
CPC .. G03B 21/16; G03B 21/2013; G03B 21/204; H04N 9/3105; H04N 9/3144; H04N 9/3158; H04N 9/3161; H04N 9/3164
See application file for complete search history.

(56) References Cited

U.S. PATENT DOCUMENTS

| | | |
|---|---|---|
| 2009/0078949 A1 | 3/2009 | Bechtel et al. |
| 2012/0242963 A1 | 9/2012 | Ohta |
| 2018/0059521 A1 | 3/2018 | Nishimori et al. |
| 2019/0129237 A1* | 5/2019 | Nishi ............... G03B 21/16 |

FOREIGN PATENT DOCUMENTS

| | | |
|---|---|---|
| JP | 2008-521233 A | 6/2008 |
| JP | 2012-199453 A | 10/2012 |
| JP | 2018-031848 A | 3/2018 |

* cited by examiner

*Primary Examiner* — Peter B Kim
(74) *Attorney, Agent, or Firm* — Oliff PLC (57) ABSTRACT

A light source apparatus includes a first light source that emits first light belonging to a first wavelength band, a second light source that emits second light belonging to a second wavelength band, a wavelength converter that contains a phosphor and converts the first light into third light belonging to a third wavelength band different from the first, a first heat dissipation member that includes a plurality of first fins and dissipates heat generated by the first light source, a second heat dissipation member that includes a plurality of second fins and dissipates heat generated by the second light source, and a first direction wherein first channels, specified by the gaps between the first fins and along which a refrigerant is supplied, extend coincides with a second direction wherein second channels, specified by the gaps between the second fins and along which the refrigerant is supplied, extend.

12 Claims, 5 Drawing Sheets

LIGHT SOURCE APPARATUS AND PROJECTOR

The present application is based on, and claims priority from JP Application Serial Number 2020-055514, filed Mar. 26, 2020, the disclosure of which is hereby incorporated by reference herein in its entirety.

BACKGROUND

1. Technical Field

The present disclosure relates to a light source apparatus and a projector.

2. Related Art

In recent years, there is a proposal that a light source apparatus used in a projector uses fluorescence emitted from a phosphor when the phosphor is irradiated with excitation light outputted from a light emitting device. JP-T-2008-521233 discloses a light source apparatus that includes a flat-plate-shaped wavelength conversion member containing a phosphor and a light emitting diode that outputs excitation light and causes the excitation light to be incident via a large-area surface out of a plurality of surfaces of the wavelength conversion member and converted light to exit via a small-area surface out of the surfaces of the wavelength conversion member.

In the light source apparatus described above, when bright illumination light is produced by the light source apparatus, the amount of heat generated in the light source apparatus increases, and it is therefore necessary to improve the heat dissipation capability of the light source apparatus. Typically, to improve the heat dissipation capability of a light source apparatus, there is, however, a problem of an increase in the size of the light source apparatus configuration.

SUMMARY

To solve the problem described above, according to a first aspect of the present disclosure, there is provided a light source apparatus including a first light source that emits first light that belongs to a first wavelength band, a second light source that emits second light that belongs to a second wavelength band, a wavelength converter that contains a phosphor and converts the first light emitted from the first light source into third light that belongs to a third wavelength band different from the first wavelength band, a first heat dissipation member that includes a plurality of first fins and dissipates heat generated by the first light source, and a second heat dissipation member that includes a plurality of second fins and dissipates heat generated by the second light source, and a first direction in which first channels, which are specified by gaps between the plurality of first fins and along which a refrigerant is supplied, extend coincides with a second direction in which second channels, which are specified by gaps between the plurality of second fins and along which the refrigerant is supplied, extend.

According to a second aspect of the present disclosure, there is provided a projector including a light source apparatus according to the first aspect of the present disclosure, a light modulator that modulates light from the light source apparatus in accordance with image information, and a projection optical apparatus that projects the light modulated by the light modulator.

DESCRIPTION OF EXEMPLARY EMBODIMENTS

Embodiments of the present disclosure will be described below with reference to the drawings.

A projector according to the embodiments of the present disclosure is an example of a projector using a liquid crystal panel as a light modulator.

In the following drawings, components are drawn at different dimensional scales in some cases for clarification of each of the components.

First Embodiment

Figure 1:
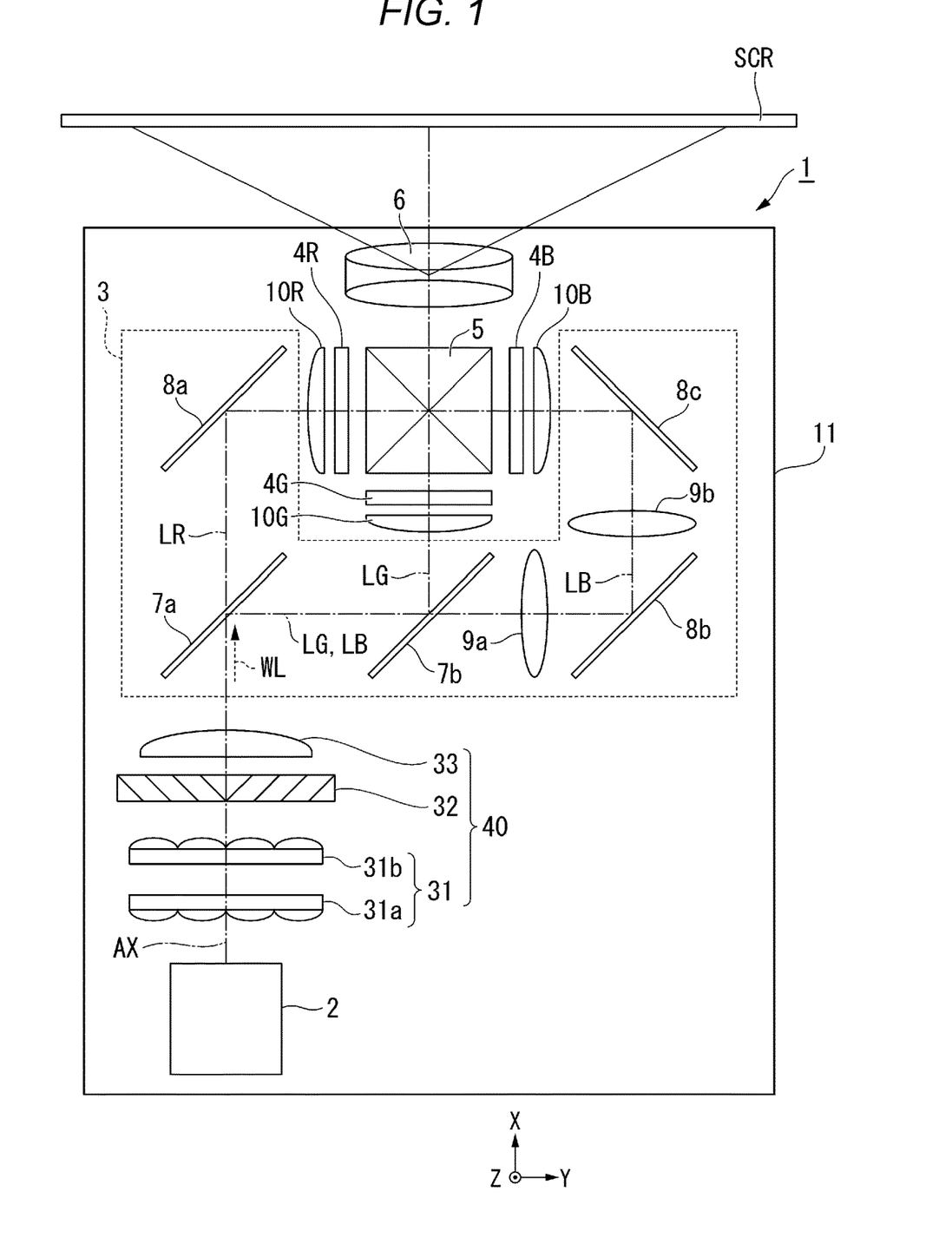
FIG. 1 shows the configuration of a projector according to a first embodiment.

FIG. 1 shows the configuration of the projector according to the present embodiment.

A projector 1 according to the present embodiment shown in FIG. 1 is a projection-type image display apparatus that displays a color image on a screen (projection receiving surface) SCR. The projector 1 uses three light modulators corresponding to color light fluxes, red light LR, green light LG, and blue light LB.

The projector 1 includes a light source apparatus 2, a uniform illumination system. 40, a color separation system 3, light modulators 4R, 4G, and 4B, a light combining system 5, a projection optical apparatus 6, and a case 11. The case 11 is an enclosure that accommodates the light source apparatus 2, the uniform illumination system 40, the color separation system 3, the light modulators 4R, 4G, and 4B, the light combining system 5, and the projection optical apparatus 6. The case 11 has a first surface 11a, a second surface 11b, and case side surfaces 11c, which connect the first surface 11a to the second surface 11b. The following description will be made by using an XYZ orthogonal coordinate system as required. The axis Z is an axis extending an upward/downward direction with respect to the projector 1, the axis X is an axis parallel to an optical axis AX of the light source apparatus 2, and the axis Y is an axis perpendicular to the axes X and Z. The following description will be made on the assumption that a direction Z along the axis Z is the upward/downward direction, and the upward/downward direction with respect to the projector 1 changes as appropriate in accordance with the attitude of the installed projector 1 and is not limited to the above definition.

The light source apparatus 2 outputs illumination light WL toward the uniform illumination system 40. The configuration of the light source apparatus 2 will be described later in detail.

The uniform illumination system 40 includes an optical integration system 31, a polarization converter 32, and a superimposing system 33. The optical integration system 31 includes a first lens array 31a and a second lens array 31b. The polarization converter 32 converts the polarization direction of the light having exited out of the optical integration system 31. Specifically, the polarization converter 32 converts sub-light fluxes into which the first lens array 31a divides the illumination light WL and which exit out of the second lens array 31b into linearly polarized light fluxes. The polarization converter 32 includes a polarization separation layer that directly transmits one of linearly polarized light components contained in the illumination light WL emitted from the light source apparatus 2 and reflects another one of the linearly polarized light components in a direction perpendicular to the optical axis, a reflection layer that reflects the other linearly polarized light component reflected off the polarization separation layer in the direction parallel to the optical axis, and a retardation film that converts the other linearly polarized light component reflected off the reflection layer into the one linearly polarized light component. The superimposing system 33 cooperates with the optical integration system 31 to homogenize the illuminance distribution of the illumination light WL in an illumination receiving region.

The uniform illumination system 40 thus homogenizes the intensity distribution of the illumination light WL emitted from the light source apparatus 2 at each of the light modulators 4R, 4G, and 4B, which are each the illumination receiving region. The illumination light WL having exited out of the uniform illumination system 40 enters the color separation system 3.

The color separation system 3 separates the illumination light WL, which is white light, into the red light LR, the green light LG, and the blue light LB. The color separation system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a separates the illumination light WL from the light source apparatus 2 into the red light LR and the other light (green light LG and blue light LB). The first dichroic mirror 7a transmits the separated red light LR and reflects the other light (green light LG and blue light LB). On the other hand, the second dichroic mirror 7b separates the other light into the green light LG and the blue light LB. The second dichroic mirror 7b reflects the separated green light LG and transmits the separated blue light LB.

The first reflection mirror 8a is disposed in the optical path of the red light LR and reflects the red light LR having passed through the first dichroic mirror 7a toward the light modulator 4R. On the other hand, the second reflection mirror 8b and the third reflection mirror 8c are disposed in the optical path of the blue light LB and reflect the blue light LB having passed through the second dichroic mirror 7b toward the light modulator 4B. The green light LG is reflected off the second dichroic mirror 7b toward the light modulator 4G.

The first relay lens 9a and the second relay lens 9b are disposed in the optical path of the blue light LB on the light exiting side of the second dichroic mirror 7b. The first relay lens 9a and the second relay lens 9b correct a difference in the illumination distribution of the blue light LB resulting from the fact that the optical path length of the blue light LB is longer than the optical path lengths of the red light LR and the green light LG.

The light modulator 4R modulates the red light LR in accordance with image information to form an image light flux corresponding to the red light LR. The light modulator 4G modulates the green light LG in accordance with image information to form an image light flux corresponding to the green light LG. The light modulator 4B modulates the blue light LB in accordance with image information to form an image light flux corresponding to the blue light LB.

The light modulators 4R, 4G, and 4B are each, for example, a transmissive liquid crystal panel. A polarizer (not shown) is disposed on the light incident side and the light exiting side of each of the liquid crystal panels and configured to transmit only linearly polarized light polarized in a specific direction.

Field lenses 10R, 10G, and 10B are disposed on the light incident side of the light modulators 4R, 4G, and 4B, respectively. The field lenses 10R, 10G, and 10B parallelize the chief rays of the red light LR, the green light LG, and the blue light LB to be incident on the respective light modulators 4R, 4G, and 4B.

The light combining system 5 receives the image light fluxes emitted from the light modulators 4R, 4G, and 4B, combines the image light fluxes corresponding to the red light LR, the green light LG, and the blue light LB with one another, and outputs the combined image light flux toward the projection optical apparatus 6. The light combining system 5 is formed, for example, of a cross dichroic prism.

The projection optical apparatus 6 is formed of a plurality of projection lenses. The projection optical apparatus 6 enlarges the combined image light flux from the light combining system 5 and projects the enlarged image light flux toward the screen SCR. An image is thus displayed on the screen SCR.

The light source apparatus 2 will be descried below.

Figure 2:
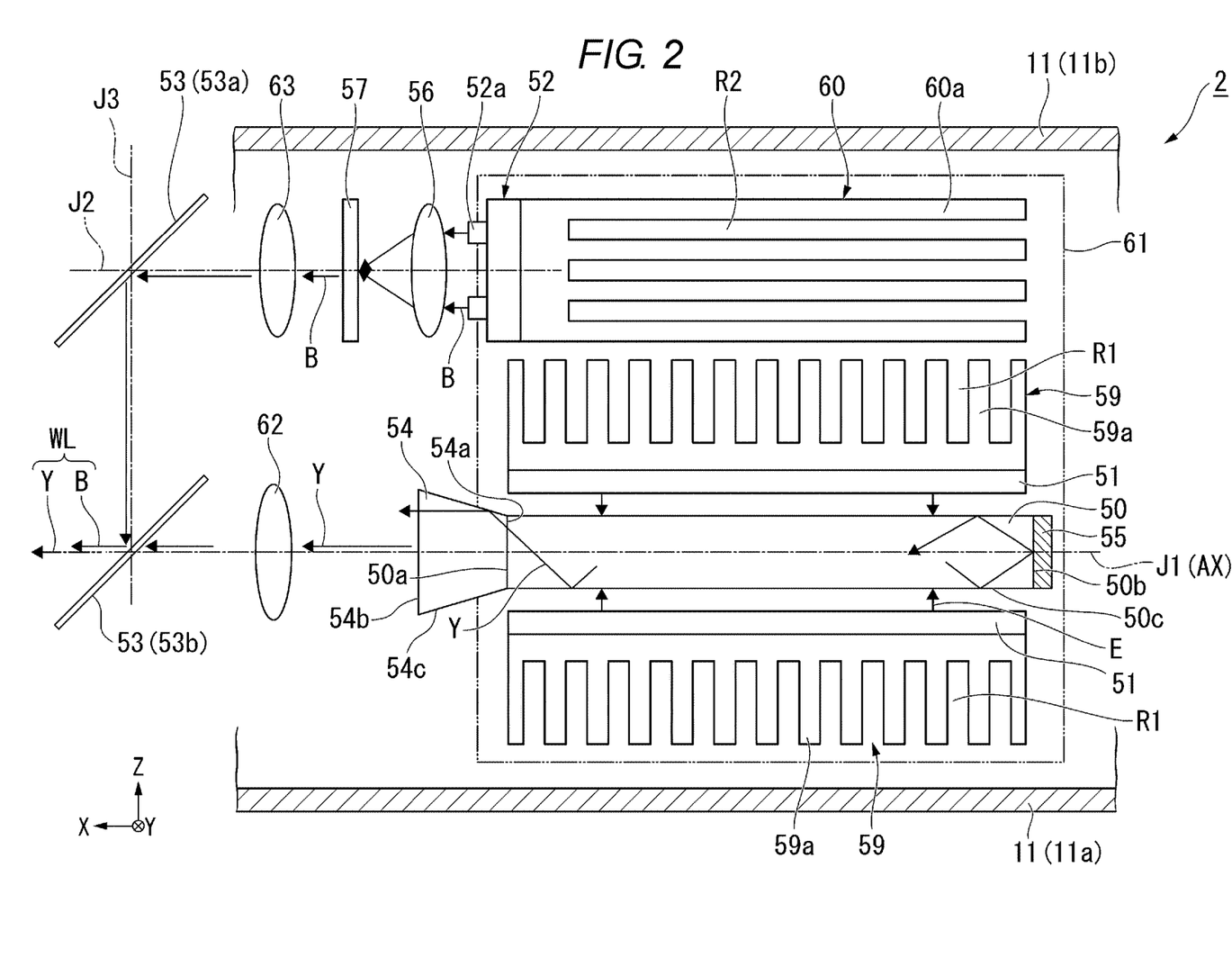
FIG. 2 is a side view showing a schematic configuration of a light source apparatus.
Figure 3:
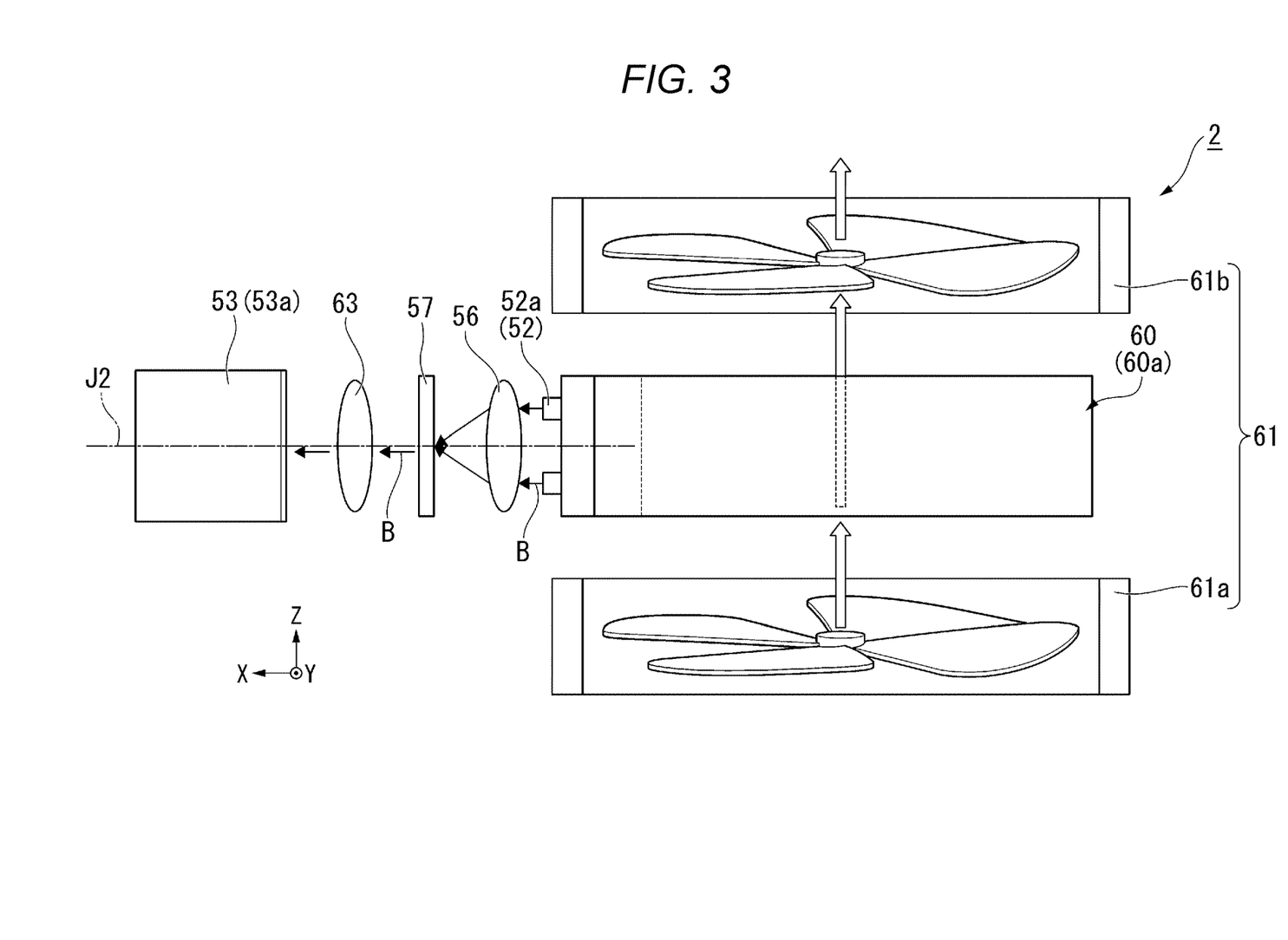
FIG. 3 is a top view showing the schematic configuration of the light source apparatus.

FIG. 2 is a side view showing a schematic configuration of the light source apparatus 2. FIG. 2 is a side view showing the light source apparatus 2 viewed from the side −Y toward the side +Y. FIG. 3 is a top view showing the schematic configuration of the light source apparatus 2. FIG. 3 is a top view showing the light source apparatus 2 viewed from the side +Z toward the side −Z.

The light source apparatus 2 includes a wavelength converter 50, a first light source 51, a second light source 52, a light combiner 53, an angle converter 54, a mirror 55, a light collection lens 56, a diffusion plate 57, a first heat dissipation member 59, a second heat dissipation member 60, a supplier 61, a first collimator lens 62, and a second collimator lens 63, as shown in FIG. 2.

In the light source apparatus 2 according to the present embodiment, the first light source 51 and the second light source 52 are arranged in the thickness direction of the case 11, that is, in the upward/downward direction along the axis-Z direction. Specifically, in the case 11, the first light source 51 is provided in a position close to the first surface 11a, and the second light source 52 is provided in a position above the first light source 51, that is, a position closer to the second surface 11b than the first light source 51.

The wavelength converter 50 has a quadrangular columnar shape and has a first end 50a and a second end 50b, which face each other, and four side surfaces 50c, which intersect the first end 50a and the second end 50b. The wavelength converter 50 at least contains a phosphor and converts excitation light E, which belongs to an excitation wavelength band, into fluorescence (third light) Y, which belongs to a third wavelength band different from the first wavelength band, to which an excitation wavelength belongs. The excitation light E enters the wavelength converter 50 via the side surfaces 50c, and the fluorescence Y exits out of the wavelength converter 50 via the first end 50a in the direction +X.

The wavelength converter 50 does not necessarily have a quadrangular columnar shape and may instead have a triangular or other polygonal columnar shape. The wavelength converter 50 may still instead have a cylindrical shape.

The wavelength converter 50 contains a ceramic phosphor (polycrystal phosphor) that converts the excitation light E in terms of wavelength into the fluorescence Y. The wavelength band to which the fluorescence Y belongs is, for example, a yellow wavelength region ranging from 490 to 750 nm. That is, the fluorescence Y is yellow fluorescence containing a red light component and a green light component.

The wavelength converter 50 may contain a single crystal phosphor in place of a polycrystal phosphor. The wavelength converter 50 may instead be made of fluorescent glass. Still instead, the wavelength converter 50 may be formed of a binder which is made of glass or resin and in which a large number of phosphor particles are dispersed. The wavelength converter 50 made of any of the materials described above converts the excitation light E into the fluorescence Y, which belongs to the third wavelength band.

Specifically, the material of the wavelength converter 50 contains, for example, an yttrium-aluminum-garnet-based (YAG-based) phosphor. Consider YAG:Ce, which contains cerium (Ce) as an activator byway of example, and the wavelength converter 50 can be made, for example, of a material produced by mixing raw powder materials containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, or a thermal plasma method or any other gas-phase method.

The first light source 51 includes LEDs that output the excitation light (first light) E, which is blue light. In the present embodiment, the light source apparatus 2 includes two first light sources 51. The two first light sources 51 are so provided as to face the side surfaces 50c of the wavelength converter 50 and output the excitation light E toward the side surfaces 50c. The excitation wavelength band, which is the first wavelength band, is, for example, a blue wavelength region ranging from 400 to 480 nm and having a peak wavelength of, for example, 445 nm. That is, the excitation light E is blue light. The first light sources 51 may be so provided as to face part or entirety of the four side surfaces 50c of the wavelength converter 50. In the light source apparatus 2 according to the present embodiment, the first light sources 51 are so provided as to face the side surface 50c facing the side +Z, which is the upper side, and the side surface 50c facing the side −Z, which is the lower side, out of the four side surfaces 50c of the wavelength converter 50. In the present embodiment, the light source apparatus 2 includes two first light sources 51, but not necessarily, and may include one first light source 51 or three or more first light sources 51.

The first light sources 51 each include LEDs that output the blue excitation light E and may include not only the LEDs but other optical members, such as a light guide plate, a diffusion plate, and a lens. The number of LEDs is not limited to a specific number.

The first heat dissipation member 59 dissipates heat generated by the first light sources 51. The first heat dissipation member 59 includes a plurality of first fins 59a and has first channels R1 specified by the gaps between the plurality of first fins 59a. The first heat dissipation member 59 dissipates the heat by transferring the heat to a refrigerant supplied along the first channels R1. The first heat dissipation member 59 is formed of a heat sink made of metal and having high heat dissipation capability. The light source apparatus 2 includes two first heat dissipation members 59. One of the first heat dissipation members 59 is attached to the opposite surface of one of the first light sources 51 from the side toward which the excitation light E is outputted, and the other first heat dissipation member 59 is attached to the opposite surface of the other first light source 51 from the side toward which the excitation light E is outputted. In the present embodiment, the light source apparatus 2 includes two first heat dissipation members 59, but not necessarily, and may include one first heat dissipation member 59 or three or more first heat dissipation members 59.

The first fins 59a are each a plate-shaped member along the plane YZ. The first heat dissipation members 59 are each configured by arranging a plurality of first fins 59a along the axis-X direction. The first fins 59a are so arranged at predetermined intervals as to form the first channels R1 between adjacent fins. The first channels R1 extend along the axis-Y direction. That is, in the first heat dissipation members 59 in the present embodiment, a first direction in which the first channels R1 extend corresponds to the "axis-Y direction."

The mirror 55 is provided at the second end 50b of the wavelength converter 50. The mirror 55 reflects the fluorescence Y having been guided in the wavelength converter 50 and having reached the second end 50b. The mirror 55 is formed of a metal film or a dielectric multilayer film formed on the second end 50b of the wavelength converter 50.

In the light source apparatus 2 having the configuration described above, when the excitation light E emitted from the first light sources 51 enters the wavelength converter 50, the phosphor contained in the wavelength converter 50 is excited, and the fluorescence Y emits from arbitrary light emission points. The fluorescence Y travels omnidirectionally from the arbitrary light emission points, and the fluorescence Y traveling toward the side surfaces 50c are totally reflected off the side surfaces 50c and travels toward the first end 50a or the second end 50b while repeatedly totally reflected. The fluorescence Y traveling toward the first end 50a enters the angle converter 54. On the other hand, the fluorescence Y traveling toward the second end 50b is reflected off the mirror 55 and travels toward the first end 50a.

Out of the excitation light E having entered the wavelength converter 50, part of the excitation light E not having been used to excite the phosphor is reflected off the mirror 55 provided at the second end 50b and is therefore confined in the wavelength converter 50 and reused.

The fluorescence Y produced in the wavelength converter 50 enters the angle converter 54. The angle converter 54 functions as a light collection lens that is provided on the light exiting side of the first end 50a of the wavelength converter 50 and collects the fluorescence Y emitted from the wavelength converter 50. The angle converter 54 also has the function of a pickup lens that picks up the fluorescence Y emitted from the wavelength converter 50. The angle converter 54 is attached to the first end 50a of the wavelength converter 50 via a light transmissive adhesive layer (not shown).

The angle converter 54 is formed of a tapered rod having a first end 54a, which faces the wavelength converter 50, a second end 54b, which faces the first collimator lens 62, and a side surface 54c, which reflects the light having entered the angle converter 54.

It is now defined that a center axis passing through the centers of the first end 50a and the second end 50b of the wavelength converter 50 is an optical axis J1 of the wavelength converter 50. An axis extending in parallel to the optical axis J1 is defined as an optical axis J2 of the second light source 52. An axis perpendicular to the optical axes J1 and J2 and passing through the center of the light combiner 53 is defined as an optical axis J3. In the present embodiment, the optical axis AX of the light source apparatus 2 coincides with the optical axis J1 of the wavelength converter 50.

In the present embodiment, the angle converter 54 has a truncated quadrangular pyramidal shape so shaped that the cross-sectional area perpendicular to the optical axis J1 increases along the light traveling direction and the cross-sectional area of the second end 54b is greater than the cross-sectional area of the first end 54a.

The fluorescence Y having entered the angle converter 54 having the configuration described above changes its orientation while traveling in the angle converter 54 in such a way that the direction of the fluorescence Y approaches the direction parallel to the optical axis J1 whenever the fluorescence Y is totally reflected off the side surface 54c. The angle converter 54 thus makes the maximum exiting angle of the fluorescence Y that exits via the second end 54b smaller than the maximum incident angle of the fluorescence Y incident on the first end 54a. That is, the angle converter 54 parallelizes the fluorescence Y and outputs the parallelized fluorescence Y via the second end 54b.

The angle converter 54 may be formed of a compound parabolic concentrator (CPC). The same effects is provided both when a CPC is used as the angle converter 54 and when a tapered rod is used as the angle converter 54.

The first collimator lens 62 is provided on the light exiting side of the second end 54b of the angle converter 54. The first collimator lens 62 is formed of a convex lens. The first collimator lens 62 parallelizes the fluorescence Y having exited out of the angle converter 54. That is, the first collimator lens 62 further increases the parallelism of the fluorescence Y having an angle distribution converted by the angle converter 54. The first collimator lens 62 can thus increase the light use efficiency of the uniform illumination system 40, which is a downstream optical system, by further increasing the parallelism of the fluorescence Y. When only the angle converter 54 provides sufficient parallelism of the fluorescence Y, the first collimator lens 62 may be omitted.

The second light source 52 includes a plurality of semiconductor lasers 52a. The plurality of semiconductor lasers 52a are arranged in an array when viewed in the direction of the optical axis J2 of the second light source 52. The plurality of semiconductor lasers 52a each output blue light (second light) B, which belongs to a second wavelength band different from the third wavelength band, to which the fluorescence Y belongs, toward the diffusion plate 57. The second wavelength band is, for example, a blue wavelength band ranging from 440 to 480 nm. The second light source 52 may instead be formed of only one semiconductor laser 52a. The second light source 52 outputs the blue light B in the direction +X. In the present embodiment, the direction in which the wavelength converter 50 emits the fluorescence Y (direction +X) coincides with the direction in which the second light source 52 outputs the blue light B (direction +X).

The second heat dissipation member 60 dissipates heat generated by the second light source 52. The second heat dissipation member 60 includes a plurality of second fins 60a and has second channels R2 specified by the gaps between the plurality of second fins 60a. The second heat dissipation member 60 dissipates the heat by transferring the heat to a refrigerant supplied along the second channels R2.

The second heat dissipation member 60 is formed of a heat sink made of metal and having high heat dissipation capability. The second heat dissipation member 60 is attached to the opposite surface of the second light source 52 from the side toward which the blue light B is outputted.

The second fins 60a are each a plate-shaped member along the plane XY. The second heat dissipation member 60 is configured by arranging the plurality of second fins 60a along the axis-Z direction. The second fins 60a are so arranged at predetermined intervals as to form the second channels R2 between adjacent fins. The second channels R2 extend along the axis-Y direction. That is, in the second heat dissipation member 60 in the present embodiment, a second direction in which the second channels R2 extend corresponds to the "axis-Y direction."

The first heat dissipation members 59 are thermally separate from the second heat dissipation member 60. That is, the first heat dissipation members 59 are so disposed as to be close to but not to be in contact with the second heat dissipation member 60. Further, one of the first heat dissipation members 59 is disposed between the second heat dissipation member 60 and one of the first light sources 51.

In the first heat dissipation members 59, the first channels R1 extend in the axis-Y direction, as described above. That is, in the light source apparatus 2 according to the present embodiment, the first direction, in which the first channels R1 extend, coincides with the second direction, in which the second channels R2 extend.

The diffusion plate 57 is provided on the light exiting side of the second light source 52. The diffusion plate 57 diffuses the blue light B emitted from the second light source 52. The diffusion plate 57 is formed, for example, of a microlens array, a holographic diffuser, a ground glass plate having a surface provided with irregularities, or a fly-eye lens formed of two microlens arrays. The diffusion angle distribution of the blue light B having passed through the diffusion plate 57 is wider than the diffusion angle distribution of the blue light B before passing through the diffusion plate 57. The angle of diffusion of the blue light B can thus be so increased as to be comparable to the angle of diffusion of the fluorescence Y. As a result, color unevenness of the illumination light WL resulting from a difference between the angle of diffusion of the blue light B and the angle of diffusion of the fluorescence Y can be suppressed.

The second collimator lens 63 is provided on the light exiting side of the diffusion plate 57. The second collimator lens 63 parallelizes the blue light B having exited out of the diffusion plate 57 and guides the parallelized blue light B to the light combiner 53.

In the present embodiment, the direction in which the wavelength converter 50 emits the fluorescence Y (direction +X) coincides with the direction in which the second light source 52 outputs the blue light B (direction +X). The light combiner 53 is disposed on the light exiting side of the wavelength converter 50 and the second light source 52.

The light combiner 53 combines the blue light B emitted from the second light source 52 and the fluorescence Y emitted from the wavelength converter with each other. The light combiner 53 includes a reflection mirror 53a and a dichroic mirror 53b. The reflection mirror 53a reflects the blue light B emitted from the second light source 52 toward the dichroic mirror 53b. The dichroic mirror 53b is so disposed as to incline by an angle of 45 degrees with respect to the optical axes J1 and J3.

The dichroic mirror 53b is formed of a dielectric multilayer film, reflects the blue light B reflected off the reflection mirror 53a toward the uniform illumination system 40, and transmits the fluorescence Y emitted from the wavelength converter 50. As a result, the white illumination light WL, which is the combination of the yellow fluorescence Y and the blue light B, exits out of the dichroic mirror 53b of the light combiner 53.

The illumination light WL emitted from the light source apparatus 2 enters the uniform illumination system 40 shown in FIG. 1. The uniform illumination system. 40 uniformly illuminates the light modulators 4R, 4G, and 4B, which are each the illumination receiving region, with the illumination light WL.

The supplier 61 supplies the first channels R1 of the first heat dissipation members 59 and the second channels R2 of the second heat dissipation member 60 with the refrigerant. The supplier 61 supplies the first channels R1 and the second channels R2 with air as the refrigerant.

In the present embodiment, the first light sources 51 and the second light source 52 are arranged in the thickness direction of the case 11 (upward/downward direction). The direction in which the supplier 61 supplies the refrigerant is set to be a direction different from the direction in which the first light sources 51 and the second light source 52 are arranged.

Specifically, the supplier 61 supplies the refrigerant in the axis-Y direction along the first surface 11a and the second surface 11b of the case 11, which extend along the plane XY. Since the first channels R1 and the second channels R2 each extend in the axis-Y direction as described above, the supplier 61 can supply the first channels R1 and the second channels R2 with air.

The refrigerant is not limited to air and may be any medium that cools the first heat dissipation members 59 and the second heat dissipation member 60. Further, the heat dissipation capability of the first heat dissipation members 59 and the second heat dissipation member 60 may be improved by causing the supplier 61 to supply air cooled in advance to a temperature lower than room temperature.

The supplier 61 in the present embodiment includes a first fan 61a, which is provided on the upstream of the first channels R1 and the second channels R2, which is the negative side the direction Y, and a second fan 61b, which is provided on the downstream of the first channels R1 and the second channels R2, which is the positive side the direction Y, as shown in FIG. 3. The first fan 61a and the second fan 61b are so disposed as to face each other and sandwich the first channels R1 and the second channels R2.

In the present embodiment, the first fan 61a and the second fan 61b are each an axial fan. The first fan 61a or the second fan 61b is not limited to an axial fan and may, for example, be a sirocco fan but is desirably an axial fan. When the first fan 61a and the second fan 61b are each an axial fan, the flow rate can be greater, for example, than a sirocco fan and other fans. The supplier 61 can thus efficiently cool the first heat dissipation members 59 and the second heat dissipation member 60.

In the light source apparatus 2 according to the present embodiment, the first fan 61a and the second fan 61b are arranged along the axis-Y direction different from the thickness direction of the case 11. That is, since the first fan 61a and the second fan 61b are not arranged in the thickness direction of the case 11, an increase in the dimension of the case 11 in the thickness direction can be suppressed. The thickness direction of the case 11 used herein refers to the direction from the first surface 11a toward the second surface 11b, that is, the distance perpendicular to the first surface 11a when the distance between the first surface 11a and the second surface 11b is greater than the maximum dimension of the first surface 11a. When the distance between the first surface 11a and the second surface 11b is smaller than the maximum dimension of the first surface 11a, the thickness direction is the direction from one of case side surfaces 11c that face each other, toward the other side surface 11c, that is, the direction perpendicular to the one case side surface. In the light source apparatus 2 according to the present embodiment, the thickness direction is the direction from the first surface 11a toward the second surface 11b, that is, the direction perpendicular to the first surface 11a.

Figure 4:
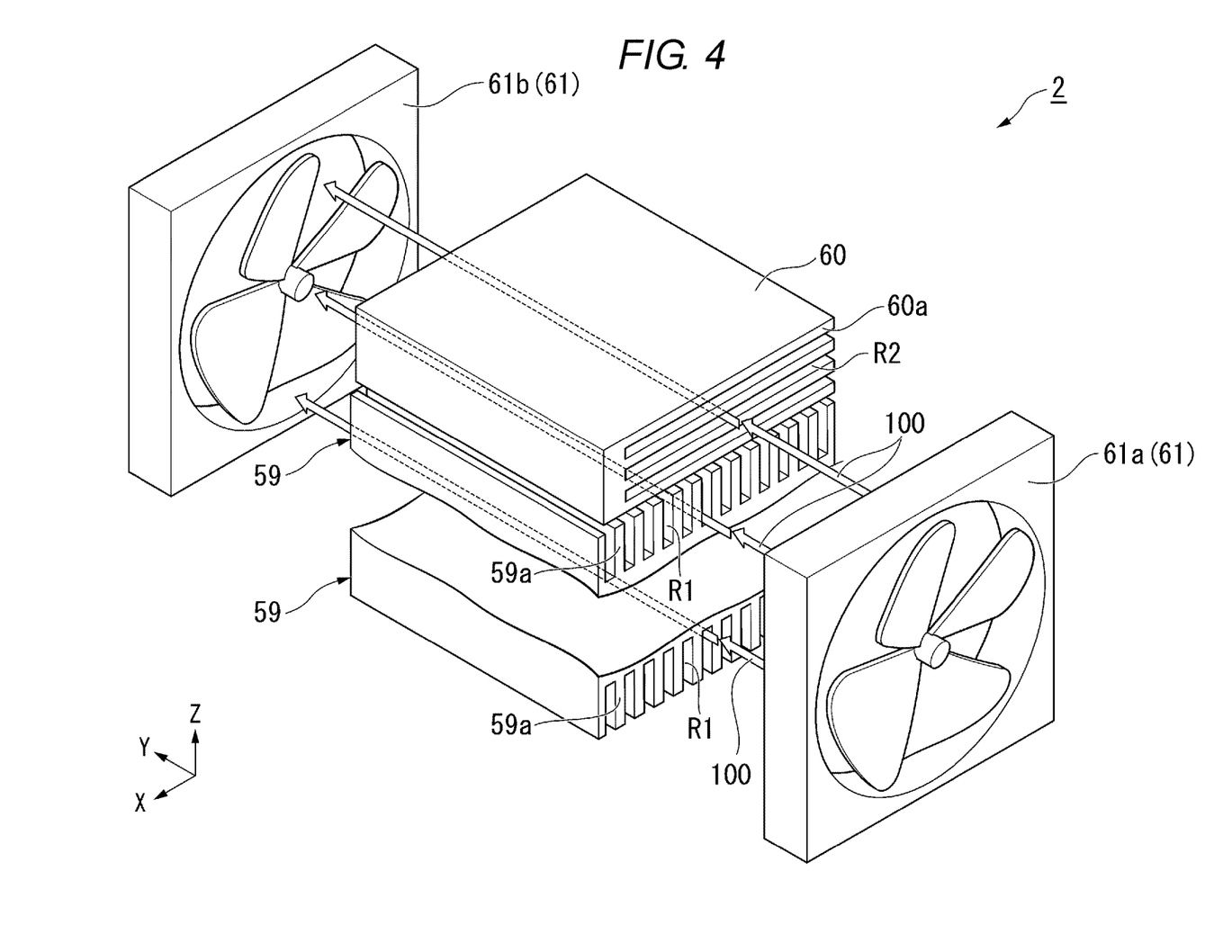
FIG. 4 is a perspective view showing the configuration of key parts of first and second heat dissipation members.

FIG. 4 is a perspective view showing the configuration of key parts of the first heat dissipation members 59 and the second heat dissipation member 60.

The first fan 61a provided on the upstream of the first channels R1 and the second channels R2 supplies air (refrigerant) 100 to the channels, as shown in FIG. 4. The air 100 supplied by the first fan 61a draws heat from the plurality of fins 59a of the first heat dissipation members 59 and the plurality of second fins 60a of the second heat dissipation member 60 when the air 100 passes through the first channels R1 and the second channels R2. The air 100 having drawn heat from the first heat dissipation members 59 and the second heat dissipation member 60 is discharged out of the first channels R1 and the second channels R2 by the second fan 61b provided on the downstream of the first channels R1 and the second channels R2.

According to the supplier 61 having the configuration described above, the first fan 61a, which is disposed on the upstream of the first channels R1 and the second channels R2, and the second fan 61b, which is disposed on the downstream of the first channels R1 and the second channels R2, efficiently supply the first channels R1 and the second channels R2 with the air 100 as the refrigerant and efficiently discharge the air 100 having drawn the heat out of the first channels R1 and the second channels R2.

Effects of Embodiment

The light source apparatus 2 according to the present embodiment provides the effects below.

The light source apparatus 2 according to the present embodiment includes the first light sources 51, which each output the excitation light E, the second light source 52, which outputs the blue light B, the wavelength converter 50, which contains the phosphor and converts the excitation light E emitted from the first light sources 51 into the fluorescence Y, the first heat dissipation members 59, which each include the plurality of first fins 59a and dissipate the heat generated by the first light sources 51, and the second heat dissipation member 60, which includes the plurality of second fins 60a and dissipates the heat generated by the second light source 52, and the first direction (axis-Y direction), in which the first channels R1, which are specified by the gaps between the plurality of first fins 59a and along which the air 100 as the refrigerant is supplied, extend coincides with the second direction (axis-Y direction), in which the second channels R2, which are specified by the gaps between the plurality of second fins 60a and along which the air 100 as the refrigerant is supplied, extend.

The light source apparatus 2 according to the present embodiment allows the direction in which the air 100 is supplied to the first channels R1 and the second channels R2 and the direction in which the air 100 from the first channels R1 and the second channels R2 is discharged to be aligned with each other or to be one direction because the direction in which the air 100, which is the refrigerant, flows coincides with the direction in which the first channels R1 and the second channels R2 extend. Aligning the direction in which the air 100 is supplied to the first channels R1 and the second channels R2 and the direction in which the air 100 is discharged from the first channels R1 and the second channels R2 allows simultaneous cooling of the first light sources 51 and the second light source 52 with the air 100 flowing in the one direction. The supplier 61, which supplies the first light sources 51 and the second light source 52 with the air 100, can therefore be shared by the first light sources 51 and the second light source 52, whereby the size of the cooling structure in the light source apparatus 2 can be reduced. A compact light source apparatus 2 that excels in heat dissipation capability is therefore provided.

Aligning the direction in which the air 100 is supplied to the first channels R1 and the second channels R2 and the direction in which the air 100 is discharged from the first channels R1 and the second channels R2 further allows suppression of channel resistance exerted on the air 100 by the first channels R1 and the second channels R2. The cooling efficiency of the first heat dissipation members 59 and the second heat dissipation member 60 can therefore be improved.

In the light source apparatus 2 according to the present embodiment, the direction in which the wavelength converter 50 emits the fluorescence Y coincides with the direction in which the second light source 52 outputs the blue light B. In the light source apparatus 2 according to the present embodiment, the first and second directions are perpendicular to the direction in which the second light source 52 outputs the blue light B.

According to the configuration described above, the fluorescence Y and the blue light B are outputted in the same direction, whereby the fluorescence Y and the blue light B are readily combined with each other to produce the illumination light WL. The direction in which the first channels R1 and the second channels R2 extend, that is, the direction in which the air 100 is discharged differs from the direction in which the fluorescence Y and the blue light B are outputted. The air 100 is therefore discharged in a direction different from the direction in which the light source apparatus 2 outputs the light (fluorescence Y and blue light B), whereby a risk of contamination of the optical paths of the fluorescence Y and the blue light B with dust or foreign matter contained in the air 100 being discharged. A problem of adhesion of dust or foreign matter to optical parts on which the fluorescence Y and the blue light B are incident can therefore be suppressed.

The light source apparatus 2 according to the present embodiment includes the light combiner 53, which combines the blue light B emitted from the second light source 52 and the fluorescence Y emitted from the wavelength converter 50 with each other.

The configuration described above allows generation of the illumination light WL, which is the combination of the fluorescence Y and the blue light B.

The light source apparatus 2 according to the present embodiment includes the supplier 61, which supplies the first channels R1 and the second channels R2 with the air 100. In the light source apparatus 2 according to the present embodiment, the supplier 61 includes the first fan 61a, which is provided on the upstream of the first channels R1 and the second channels R2, and the second fan 61b, which is provided on the downstream of the first channels R1 and the second channels R2. In the light source apparatus 2 according to the present embodiment, the first fan 61a and the second fan 61b are each desirably an axial fan.

According to the configuration described above, the supplier 61 can supply the first channels R1 and the second channels R2 with the air 100. Further, the first fan 61a can efficiently supply the first channels R1 and the second channels R2 with the air 100, and the second fan 61b can efficiently discharge the air 100 having drawn the heat out of the first channels R1 and the second channels R2. Use of an axial fan as each of the first fan 61a and the second fan 61b allows an increase in the flow rate, whereby the first heat dissipation members 59 and the second heat dissipation member 60 can be efficiently cooled.

The projector according to the present embodiment includes the light source apparatus 2 described above, the light modulators 4R, 4G, and 4B, which modulate the light from the light source apparatus 2 in accordance with image information, and the projection optical apparatus 6, which projects the light modulated by the light modulators 4R, 4G, and 4B.

The projector 1 according to the present embodiment, which includes the light source apparatus 2 described above, which is compact and excels in heat dissipation capability, can be a projector that is compact and excels in heat dissipation capability and is therefore reliable.

The projector 1 according to the present embodiment includes the case 11, which accommodates the light source apparatus 2, the light modulators 4R, 4G, and 4B, and the projection optical apparatus 6, and the first light sources 51 and the second light source 52 are arranged in the thickness direction of the case 11. In the projector 1 according to the present embodiment, the air 100 in the first channels R1 and the second channels R2 is desirably supplied along the first surface 11a of the case 11.

According to the configuration described above, the air 100 can be supplied to the first channels R1 and the second channels R2 in the axis-Y direction, which intersects the upward/downward direction of the case 11. In this case, the supplier 61, which supplies the air 100, is disposed along the axis-Y direction different from the thickness direction of the case 11. Therefore, since the supplier 61 is not disposed in the thickness direction of the case 11, an increase in the dimension of the case 11 in the thickness direction can be suppressed.

In the case 11, the air 100 is smoothly supplied along the first surface 11a. The air 100 therefore smoothly passes along the first channels R1 and the second channels R2, whereby the channel resistance of the first channels R1 and the second channels R2 can be suppressed.

Second Embodiment

A light source apparatus according to a second embodiment of the present disclosure will be subsequently described. The configurations common to the present embodiment and the first embodiment have the same reference characters and will not be described in detail. The light source apparatus according to the present embodiment differs from the light source apparatus 2 according to the first embodiment in terms of the structures and layout of the first and second heat dissipation members, and the other configurations are common to the present embodiment and the first embodiment.

Figure 5:
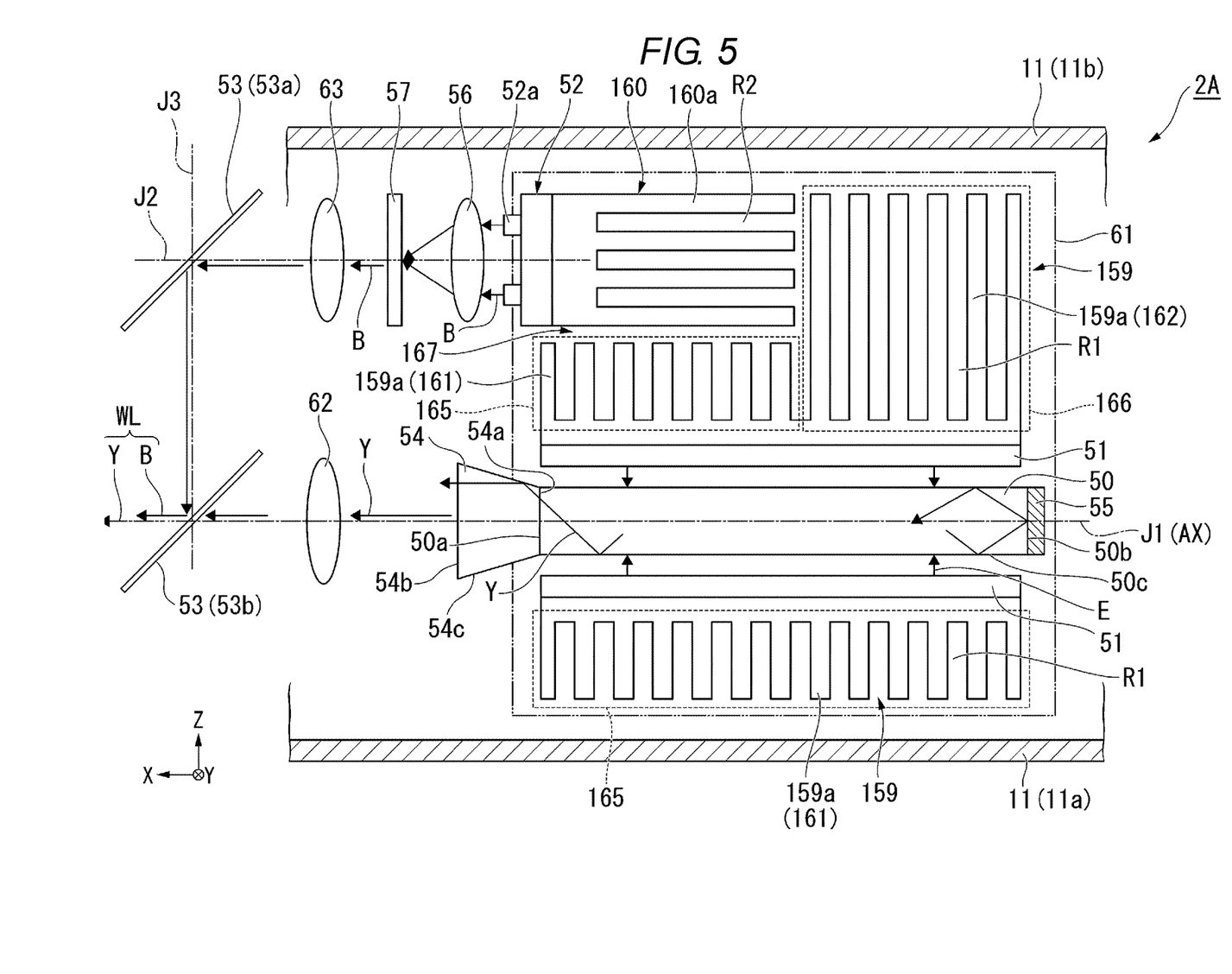
FIG. 5 is a side view showing a schematic configuration of a light source apparatus according to a second embodiment.

FIG. 5 is a side view showing a schematic configuration of a light source apparatus 2A according to the present embodiment. FIG. 5 is a side view showing the light source apparatus 2A viewed from the side −Y toward the side +Y. In FIG. 5, members common to the present embodiment and the first embodiment have the same reference characters and will not be described in detail.

In the light source apparatus 2A according to the present embodiment, first heat dissipation members 159 each include a plurality of first fins 159a, as shown in FIG. 5. The plurality of first fins 159a include a plurality of small fin members 161 and a plurality of large fin members 162, which are larger than the small fin members 161.

In the present embodiment, one of the pair of first heat dissipation members 159 disposed on opposite sides of the wavelength converter 50, that is, the first heat dissipation member 159 located on the side facing the second light source 52 includes a first portion 165, where the plurality of small fin members 161 are disposed, a second portion 166, where the plurality of large fin members 162 are disposed, and a stepped section 167, which is formed of the first portion 165 and the second portion 166. The other one of the pair of the first heat dissipation members 159, that is, the first heat dissipation member 159 located on the opposite side from the second light source 52 only includes the first portion 165 described above.

The second heat dissipation member 160 includes a plurality of second fins 160a. In the present embodiment, the plurality of second fins 160a are formed of plate-shaped members having the same size, and the plate-shaped members are each larger than the small fin members 161 described above. The second heat dissipation member 160 is disposed at the stepped section 167 of one of the first heat dissipation members 159. The first heat dissipation members 159 are thermally separate from the second heat dissipation member 160.

The light source apparatus 2A according to the present embodiment provides the effects below.

In the light source apparatus 2A according to the present embodiment, the plurality of first fins 159a include the plurality of small fin members 161 and the plurality of large fin members 162, which are larger than the small fin members 161. One of the first heat dissipation members 159 includes the first portion 165, where the plurality of small fin members 161 are disposed, the second portion 166, where the plurality of large fin members 161 are disposed, and the stepped section 167, which is formed of the first portion 165 and the second portion 166. The second heat dissipation member 160 is so configured as to be disposed at the stepped section 167.

In the light source apparatus 2A according to the present embodiment, one of the first heat dissipation members 159 is disposed in a dead space created by the region where the second heat dissipation member 160 is not formed. As a result, the dead space can be effectively used to dispose the first heat dissipation member 159 and the second heat dissipation member 160 with a necessary and sufficient area for the first heat dissipation member 159 and the second heat dissipation member 160 ensured. The heat dissipation capability can thus be improved with an increase in the size of the light source apparatus 2A suppressed.

The layout of the first and second heat dissipation members can be changed as appropriate in accordance with the heat dissipation capability necessary for the first and second light sources. For example, part of the second heat dissipation may be so disposed that part thereof occupies a dead space created by the region where no first heat dissipation member is formed.

The technical scope of the present disclosure is not limited to the embodiments described above, and a variety of changes can be made thereto to the extent that the changes do not depart from the substance of the present disclosure.

For example, the aforementioned embodiments have been described with reference to the case where the first light sources 51 are so provided as to face two of the four side surfaces 50c of the wavelength converter 50, and one of the first light sources 51 and the corresponding first heat dissipation member 59 may be provided only at one of the side surfaces 50c.

The aforementioned embodiments have been described with reference to the case where any of the light source apparatuses according to the present disclosure is used in a transmissive projector, and any of the light source apparatuses according to the present disclosure can also be used in a reflective projector. The term "transmissive" used herein means that a liquid crystal light valve including a liquid crystal panel or any other component transmits light. The term "reflective" used herein means that the liquid crystal light valve reflects light. The light modulators are each not limited to a liquid crystal light valve and may, for example, be a digital micromirror device.

The aforementioned embodiments have been described with reference to a projector using three liquid crystal panels, and the present disclosure is also applicable to a projector using only one liquid crystal light valve and a projector using four or more liquid crystal light valves.

The aforementioned embodiments have been described with reference to the case where any of the light source apparatuses according to the present disclosure is incorporated in a projector, but not necessarily. Any of the light source apparatuses according to the present disclosure may be used as a lighting apparatus, a headlight of an automobile, and other components.

What is claimed is:

1. A light source apparatus comprising:
    a first light source that emits first light that belongs to a first wavelength band;
    a second light source that emits second light that belongs to a second wavelength band;
    a wavelength converter that contains a phosphor and converts the first light emitted from the first light source into third light that belongs to a third wavelength band different from the first wavelength band;
    a first heat dissipation member that includes a first base and a plurality of first fins and dissipates heat generated by the first light source, the plurality of first fins extending from the first base in a first extending direction; and
    a second heat dissipation member that includes a second base and a plurality of second fins and dissipates heat generated by the second light source, the plurality of second fins extending from the second base in a second extending direction perpendicular to the first extending direction,
    wherein a first direction in which first channels, which are specified by gaps between the plurality of first fins and along which a refrigerant is supplied, extend coincides with a second direction in which second channels, which are specified by gaps between the plurality of second fins and along which the refrigerant is supplied, extend, the first direction and the second direction being perpendicular to the first extending direction and the second extending direction.

2. The light source apparatus according to claim 1, wherein a direction in which the wavelength converter outputs the third light coincides with a direction in which the second light source outputs the second light.

3. The light source apparatus according to claim 2,
wherein the first and second directions are perpendicular to the direction in which the second light source outputs the second light.

4. The light source apparatus according to claim 1,
wherein the first heat dissipation member is disposed between the second heat dissipation member and the first light source.

5. The light source apparatus according to claim 1,
further comprising a supplier that supplies the first channels and the second channels with the refrigerant.

6. The light source apparatus according to claim 5,
wherein the supplier includes a first fan provided on an upstream of the first channels and the second channels and a second fan provided on a downstream of the first channels and the second channels.

7. The light source apparatus according to claim 5,
wherein the first and second fans are each an axial fan.

8. The light source apparatus according to claim 1,
wherein the plurality of first fins include a plurality of small fin members and a plurality of large fin members larger than the small fin members,
the first heat dissipation member includes a first portion where the plurality of small fin members are disposed, a second portion where the plurality of large fin members are disposed, and a stepped section formed of the first portion and the second portion, and
the second heat dissipation member is disposed at the stepped section.

9. A projector comprising:
the light source apparatus according to claim 1;
a light modulator that modulates light from the light source apparatus in accordance with image information; and
a projection optical apparatus that projects the light modulated by the light modulator.

10. The projector according to claim 9,
further comprising a case that accommodates the light source apparatus, the light modulator, and the projection optical apparatus,
the first light source and the second light source are arranged in a thickness direction of the case.

11. The projector according to claim 10,
wherein the refrigerant in the first channels and the second channels is supplied along a bottom surface of the case.

12. The light source apparatus according to claim 1,
further comprising a light combiner that combines the second light emitted from the second light source and the third light emitted from the wavelength converter with each other.

* * * * *